Feb. 6, 1945.　　　C. O. WILLIAMS　　　2,368,958
FRAMING INSTRUMENT
Filed April 23, 1943
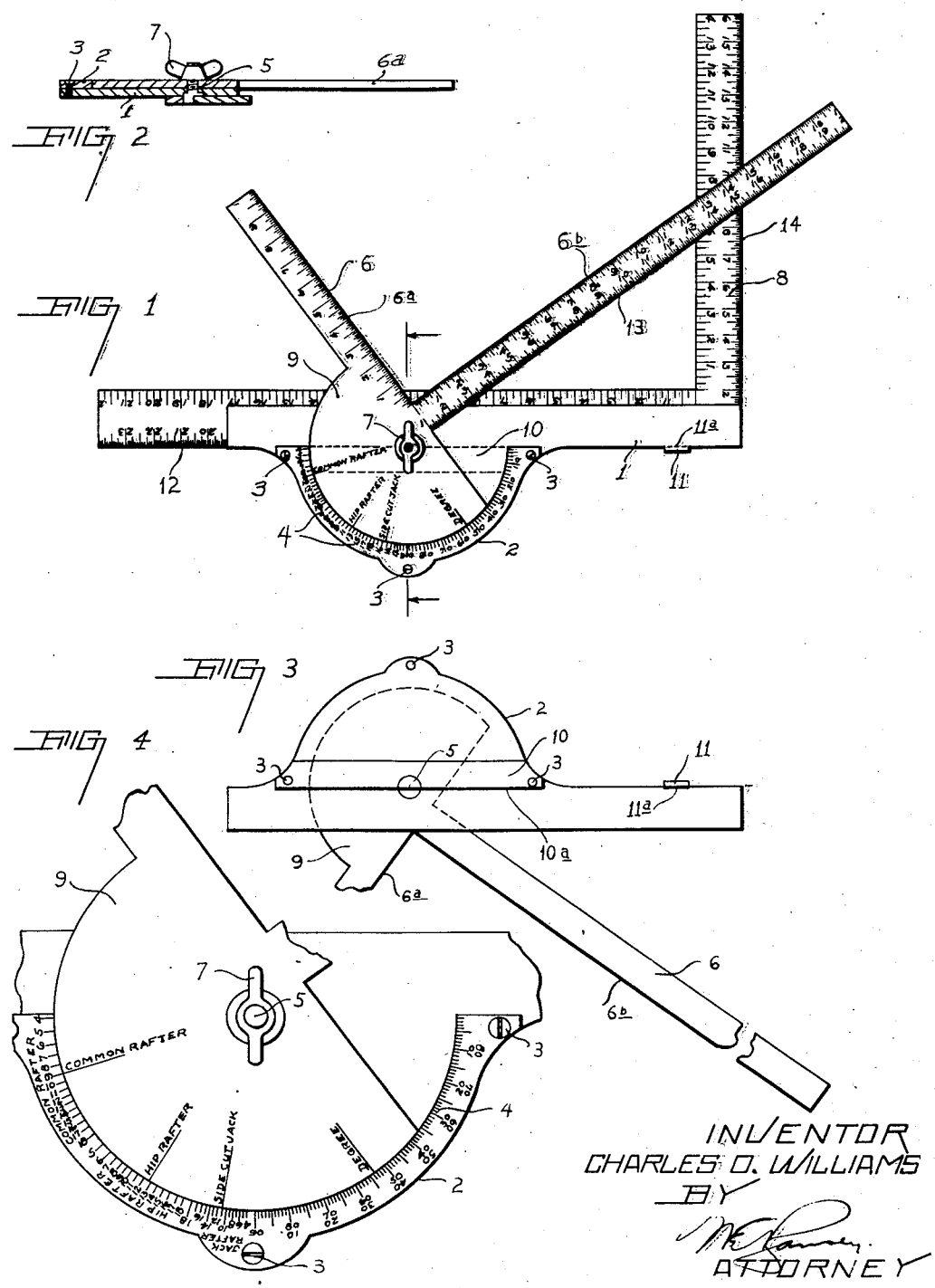
INVENTOR
CHARLES O. WILLIAMS
BY
ATTORNEY Patented Feb. 6, 1945

2,368,958

UNITED STATES PATENT OFFICE 2,368,958

FRAMING INSTRUMENT

Charles O. Williams, Washougal, Wash.

Application April 23, 1943, Serial No. 484,129

1 Claim. (Cl. 33—93)

My invention relates generally to a device to be used with a common carpenter's square for indicating and aiding in the computation of the various cuts on rafters, stair stringers and the like. The principal object of my invention is to provide an instrument of this character which will be adapted quickly and accurately to aline itself with a standard square and which may be removed therefrom and placed upon a rafter, stringer, or other member to be cut without requiring any adjustment and without involving error.

To this end, this device comprises a base member and a square member pivotally joined together upon a pivotal axis. A shoulder is formed on the base member and the square member is pivotally mounted upon axis which registers with said base member. Thus said instrument may be quickly and easily used in connection with a square, or be placed upon a member to be sawed for marking various angular cuts. Said device is arranged in registry merely by abutting said devices with the shoulder portion of said instrument. In other words, the various angular positions of the square member of said instrument are all related to the line of said shoulder. Integrally formed with said square member is a semi-circular portion carrying a plurality of spaced but correlated indicators and a circular scale is arranged upon the base. Said scale may be calibrated and formed of a plurality of sections. For example, the scale may be calibrated to show the cuts upon a common rafter, or a hip rafter, or the side cuts upon a jack rafter, or may be calibrated to degrees so as to be usable as a protractor without producing any confusion between the several scales and the indicators therefor.

Other and further details of my invention are hereinafter described with reference to the accompanying drawing, in which:

Fig. 1 is a plan view of my improved framing instrument shown in connection with a common carpenter's square to illustrate the manner in which computations may be made;

Fig. 2 is a cross-sectional view taken on the line 2—2 in Fig. 1 to show the manner in which the pivotal mounting is made, and the manner in which the parts may be held in set position;

Fig. 3 is a fragmentary view of the rear face of said device, illustrating the shoulders for alining said instrument with a square, or member to be cut; and Fig. 4 is a larger scaled fragmentary elevation of the various scales and indicators therefor to illustrate several of the manners in which said instrument may be used.

Although I have spoken of my device as a framing instrument such as is used in computing the various angular cuts of rafters, stringers and the like, used in framing a house, it is not to be deemed limited to such purposes but it is in this field that it has its greatest use, in my opinion. Said instrument comprises a base 1 which is elongated and has a circular portion 2 extending laterally therefrom, the said circular portion preferably is separate from the remainder, although not necessarily so, and if separate it is held by screws 3, or other fastening devices. Upon the face of said circular portion are a number of scales 4 extending concentrically about pivotal connection 5 between said base and square member 6. The base member 1 and the square member 6 may be held in set position by wing nut 7.

Said square member has two tongues, a short tongue 6a and a long tongue 6b. Said tongues may be of equal length but I preferably provide a short and long tongue on the square member 6 because this is common practice in a common carpenter's square 8, with which my framing is clearly adapted to be used. Said two tongues are arranged at right angles with each other as is common in a square, and adjacent the angular point of joinder, I form a semi-circular projecting portion 9. The periphery of said projecting portion is concentric with the pivotal connection 5 and lies closely within the inner or cup-shaped face of the circular portion 2 on the base. I preferably scribe on said projecting portion a number of indicating marks, as is shown most clearly in Fig. 4, and each of said marks is adapted to register with one of the several scales outlined on the circular portion 2. These indicating marks and their related scales might indicate cuts for a common rafter, a hip rafter, a side-cut of a jack rafter, or might be used to indicate angular degrees of rotation, so that the device might be used as a protractor. It is to be noted that the pivotal connection 5 lies at the datum point or zero mark for the outer scale on the long tongue 6b of each square member. Also, at the axis of rotation of said pivotal connection, I have arranged a shouldered abutment 10 and alined therewith another projecting lug 11. These are adapted to engage the outer edge 12 of the long tongue of a carpenter's square 8 as shown in Fig. 1, or the straight edge of a member to be marked for cutting. That is, the datum line for the indicator, whether used as a computing device or as an aid in scribing the various cuts, lies along the face 10a of the shouldered abutment 10 to face 11a of the lug 11 and extends through the axis of rotation of the pivotal connection 5.

I preferably space the lug 11 a substantial distance from the shouldered abutment 10 so as to obtain a relatively wide base to avoid error. I preferably select that type of a carpenter's square divided into inches and twelfths of an inch and thus, the computations may be made on the scale of an inch to the foot; the twelfth inch markings corresponding to inches of the member to be cut. The outer edge 13 of the long tongue 6b is the one used most often in computations and in scribing cutting lines. The outer edges 12 and 14 of the long and short tongues, respectively, of the carpenter's square also are used in connection therewith. Both the carpenter's square 8 and the square member 6 of the instrument have scales marked upon the inner edges for the usual purpose of measurement, but they play no great part in the use of this instrument as a computing and marking device.

As the device is arranged in Fig. 1, it shows the framing instrument set at an angle corresponding to the pitch of a 9 x 12 roof. That is, in a building twenty-four feet wide with the ridge at the center, each side would be twelve feet and the roof would have a nine foot rise. As is shown upon the indicator, this would indicate that the common rafter would be fifteen feet long and the cuts thereon would be shown by the edges of the carpenter's square. The various scales upon the circular portion 2 of the base have numerals which are associated with an indicating line and a legend. Thus, to determine the hip or valley cuts and the lengths of those rafters, the device is set so that the hip rafter scale would coincide with the line 9. The carpenter's square 8 is then pushed along the shouldered abutment 10 and the lug 11 until the short tongue of the carpenter's square intersects the edge 13 at the numeral 9 which is the rise for the common rafter. The two tongues of the carpenter's square will then show the cuts for said hip and valley rafters, and the long tongue 6b of the framing instrument will show the length thereof.

To compute or indicate the cut of the top and bottom of the jack rafters, I use the common rafter scale. To compute or indicate the side cuts of the jack rafters, a special scale is provided, as is shown in Fig. 4. The framing instrument is set at the numeral 9 on the jack side-cut scale in the example up for illustration. If a one-third pitch is desired, then the reference character 8 is used and if a one-half pitch is to be computed, then the index number 12 is used. These are cited merely by way of example. To compute the length of the jack rafters, the common rafter scale is used. The framing device is slid along the carpenter's scale one inch for each foot of spacing. That is, if the jack rafters are spaced two feet apart, then the device is slid two inches for each setting, and if an eighteen inch spacing is provided then they are slid along only an inch and a half at a time. In this manner, any type of spacing may be computed or indicated. I cite this all to illustrate the manner of use of my device in indicating or computing the cuts on the various rafters in framing a house.

If said framing instrument is used to lay out stair stringers, it is used in connection with a carpenter's square, as is illustrated in Fig. 1. The run of the stair is indicated by the long tongue of the carpenter's square, and the rise is indicated by the short tongue thereof, as the parts are shown in Fig. 1. The square member is arranged to correspond with these two dimensions and is held in adjusted position by the wing nut 7. The two tongues 6a and 6b, of the square member 6 give the cuts for the bottom and top of the stringer, and the dimension indicated by the tongue 6b gives the length of the stringer. The framing instrument may then be taken off of the carpenter's square and laid directly upon the stringer with the shouldered abutment 10 and the lug 11 engaging one edge thereof. The cuts may be then marked upon the stringer. Care must be taken, as in any device, to see that the instrument does not creep, but if the marks are made carefully and care is exercised step by step, the stringer should be marked exactly.

My indicator may be used in connection with a common square to solve almost any geometrical problem, and the angular degrees on the scales 4 may be used so that the instrument may serve as a protractor.

I claim:

A framing instrument comprising a flat, elongated base member, a semi-circular base portion depending from and removably secured to one longitudinal edge of the base member, a square member including two tongues in relatively right angled relation and a semi-circular indicator integral with the tongues, the longitudinal edge of one tongue being in line with the diametric edge of the indicator and the other tongue being at right angles to such diametric edge immediate its ends, a pivot pin connecting the semi-circular base portion and the indicator in line with one longitudinal edge of one of the tongues, the semi-circular base portion presenting a scaled margin beyond the circular edge of the indicator, and the surface of the indicator adjacent its circular edge being marked for selective cooperation with the scaled margin of the semi-circular base portion, and a shoulder abutment on the rear face of the elongated base member with one edge of such abutment passing through the center of the pivot pin in parallelism with the upper edge of the flat base member.

CHARLES O. WILLIAMS.